Figure 1:
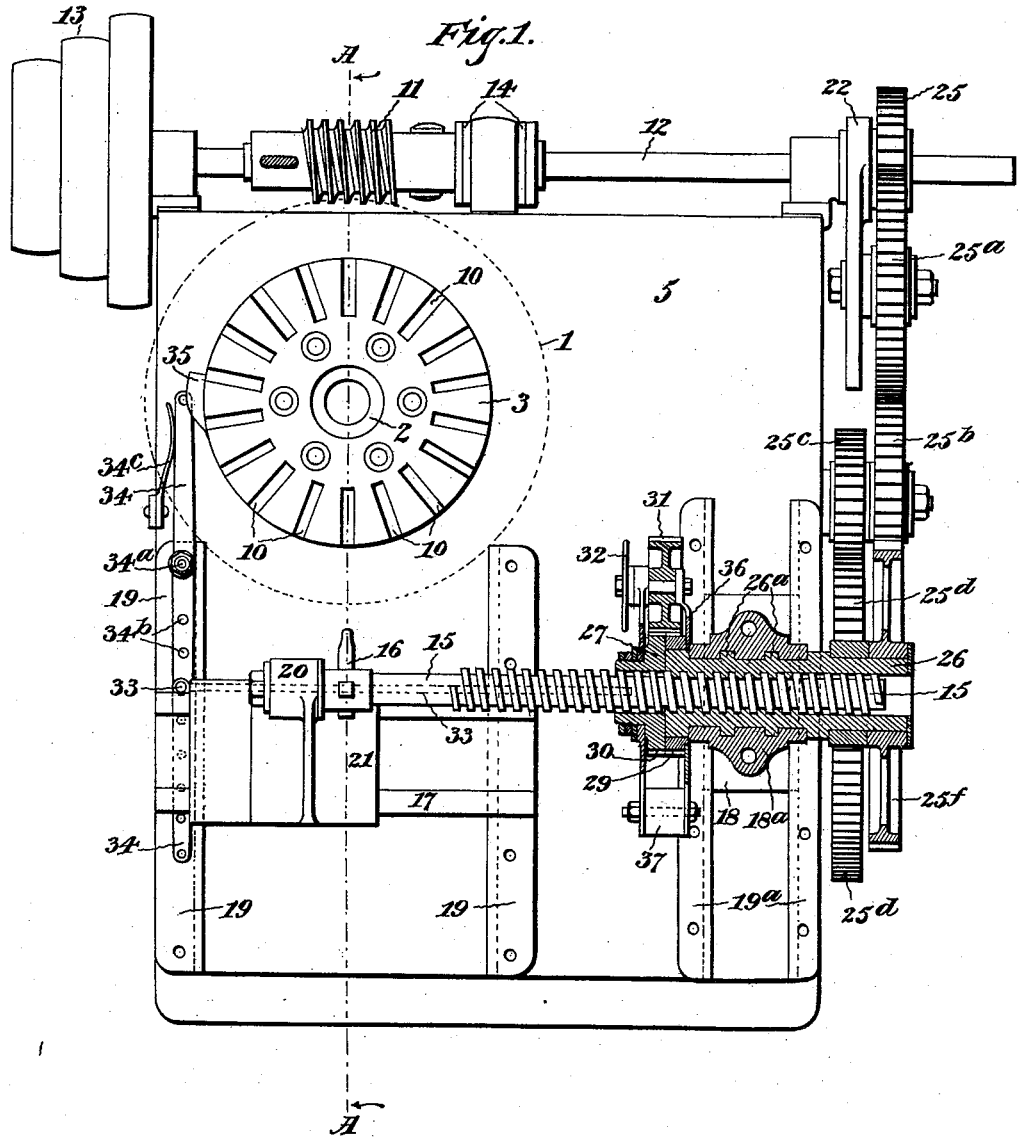

No. 606,837. Patented July 5, 1898.
J. H. GIBSON.
GEAR CUTTING MACHINE.
(Application filed Dec. 13, 1897.)
(No Model.) 3 Sheets—Sheet 1.

Witnesses.
Inventor:
Joseph H. Gibson.
Attorney.

No. 606,837. Patented July 5, 1898.
J. H. GIBSON.
GEAR CUTTING MACHINE.
(Application filed Dec. 13, 1897.)
(No Model.) 3 Sheets—Sheet 2.

Witnesses:
Inventor:
Joseph H. Gibson.
by
Attorney.

No. 606,837. Patented July 5, 1898.
J. H. GIBSON.
GEAR CUTTING MACHINE.
(Application filed Dec. 13, 1897.)
(No Model.) 3 Sheets—Sheet 3.

Witnesses:
B. S. Ober
R. W. Sommers

Inventor:
Joseph H. Gibson
by Henry Orth
Attorney.

UNITED STATES PATENT OFFICE.

JOSEPH HAMILTON GIBSON, OF EGREMONT, ENGLAND.

GEAR-CUTTING MACHINE.

SPECIFICATION forming part of Letters Patent No. 606,837, dated July 5, 1898.

Application filed December 13, 1897. Serial No. 661,654. (No model.) Patented in England December 10, 1895, No. 23,628.

*To all whom it may concern:*

Be it known that I, JOSEPH HAMILTON GIBSON, a subject of the Queen of Great Britain, residing at Egremont, county of Chester, England, have invented certain new and useful Improvements in Gear-Cutting Machines, (for which Letters Patent have been obtained in Great Britain, No. 23,628, dated December 10, 1895;) and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention has relation to machines for cutting the teeth of screw gear-wheels, and more particularly for cutting the teeth on worm-wheels.

Before my invention it has been the practice to cut the teeth of worm-wheels by means of a worm-cutter similar to the one with which the wheel whose teeth are to be cut by such cutter is designed to gear, said cutter having cutting edges produced by grooving it in the manner of a tap. This of course involves the necessity of making a separate worm-cutter for each different diameter of the worm and for each different pitch of the teeth of the worm-wheel to be cut, an operation that is an expensive one, as is well known.

The object of my invention is to avoid this expenditure by dispensing with the ordinary worm-cutter and substituting for it a revoluble cutting-tool.

The ordinary worm-cutter serves both to cut the teeth and revolve the wheel-blank. This, however, is impossible when a revoluble cutting-tool is used, as it merely effects the cutting, so that means must be provided to revolve the wheel-blank independently of the cutter. The shape of the teeth cut by either cutting-tool is the same, because the revoluble tool may be regarded, as hereinafter described, as the equivalent of the many cutting edges of the worm-cutter when the relative movements of the rotating cutter and wheel-blank are maintained.

A machine constructed in accordance with my invention comprises, therefore, a standard worm-wheel revolved by a suitable driving-worm and adapted to revolve a face-plate that carries the wheel-blank, a revoluble cutter-shaft adjustable relatively to the wheel-blank or face-plate, mechanism for rotating the cutter-shaft at the required speed relatively to the speed of the standard worm-wheel, means for adjusting the cutter relatively to its shaft or to the driving element for said shaft, so that during the operation of cutting the cutter may occupy successive positions on an imaginary helical curve of pitch equal to that of the worm that is to be used with the wheel to be cut, and means controlled by the rotation of the standard worm-wheel whereby the cutting edge of the cutter is caused to occupy the aforesaid successive positions.

Figure 2:
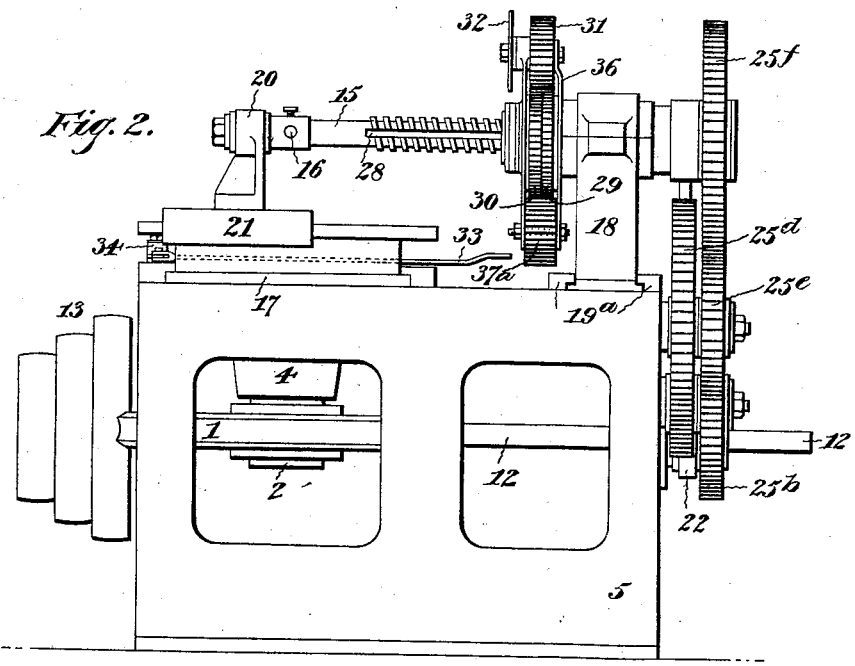
Figure 3:
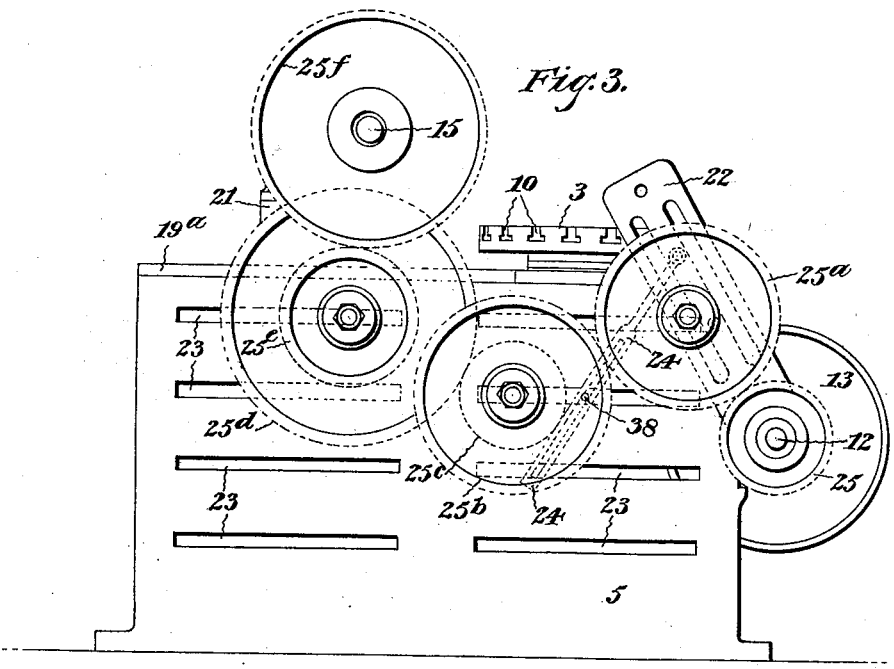
Figure 4:
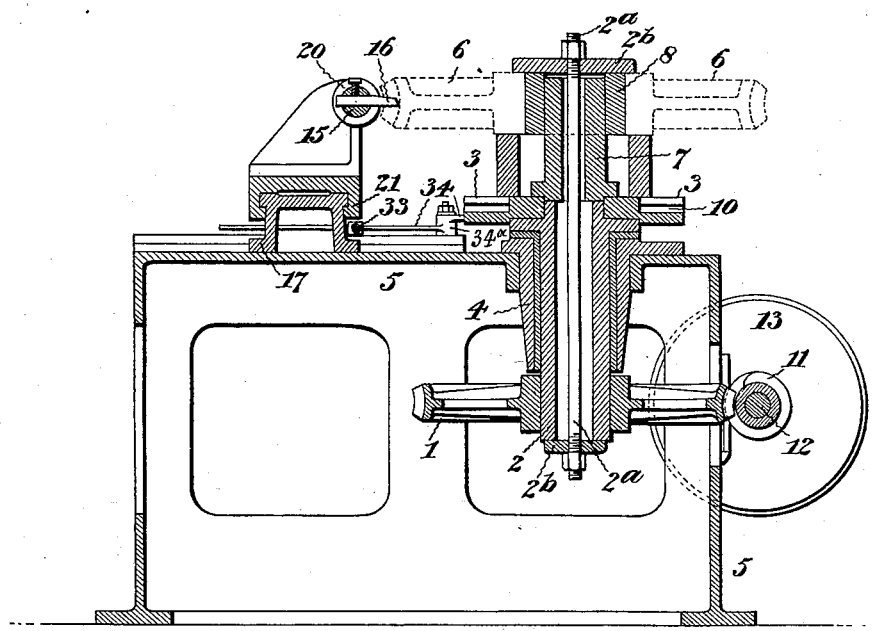
Figure 5:
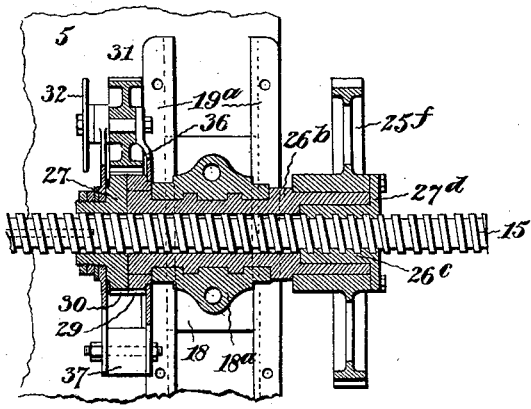

In the accompanying drawings, Figure 1 is a top plan view, partly in section, Fig. 2 a side elevation, Fig. 3 an end elevation; and Fig. 4 a section on line A A of Fig. 1, of a machine organized in accordance with my invention. Fig. 5 is a detail longitudinal sectional view of a part of the cutter-shaft and of one of its bearings, illustrating a modified arrangement of the means for imparting endwise motion to the cutter-shaft.

On a tubular vertical shaft 2, Fig. 4, mounted in a bushed bearing 4, secured to the main frame 5, is keyed a standard worm-wheel 1 and a face-plate 3 below and above the top of said frame, respectively. The worm-wheel blank 6 (shown in dotted lines) is mounted on a mandrel 7, that seats on the face-plate 3 and shaft 2, said blank being held in proper position relatively to the cutting-tool on the cutter-shaft by means of a suitable interchangeable spacing sleeve or collar 8, from which the wheel-blank is supported, the mandrel, the wheel-blank thereon, and the spacing-collar being rigidly secured together and to the tubular shaft 2 by means of a tie-rod $2^a$ and suitable head or clamping plates $2^b$.

The face-plate is provided with a number of T-slots 10, Figs. 1 and 3, for the reception of additional bolts for securing the worm-wheel blank if this becomes necessary, and in case of a blank of unusual diameter it may be further supported in the vicinity of the cutting action by a rolling bearing carried in a detachable frame.

The standard worm-wheel 1 is driven by a worm 11 on a driving-shaft 12, that carries a step-pulley 13. Back-gearing of a well-known description to reduce the speed is not shown, but will be required if the machine is used to cut coarse pitches. The thrust-collars 14 to the worm 11 have screw adjustment to prevent backlash.

The cutter-shaft 15, Fig. 1, carrying the cutter 16, is mounted in bearings carried on transverse slides 17 and 18, adjustable in a direction at right angles to the cutter-shaft on ways 19 and 19ª, respectively, the bearing 20 for the left end of said shaft being also adjustable or movable in a line parallel with said shaft, to which end said bearing is formed on or secured to a slide 21, movable on ways on slide 17. The slides may be provided with the usual traversing screws and handles, or they may be simply slid to the proper positions and there secured by tightening the ways.

The driving-shaft 12 and the cutter-shaft 15 are geared together by change-wheels, so as to give the appropriate velocity ratio between the worm-wheel blank and said cutter-shaft, this being the same as that between the finished worm-wheel and the worm destined to gear with it. These change-wheels are carried on adjustable studs in a well-known manner, the swing-frame 22 and the frame-slots 23, Fig. 3, being provided for said studs, and owing to the length of the swing-frame it is preferably clamped by a strut, such as 24, and a bolt 38 in one of the slots.

By way of example a set of seven change-wheels 25, 25ª, 25ᵇ, 25ᶜ, 25ᵈ, 25ᵉ, and 25ᶠ is shown in the drawings. The last change-wheel 25ᶠ is not secured directly to the cutter-shaft 15, but to a nut 26, that constitutes the journal or bearing for the right-hand end of said shaft, said nut being carried by the slide 18, hereinbefore referred to, the object being to provide a means for adjusting the cutter relatively to the wheel to be cut, the change-wheels 25ª to 25ᵉ being adjusted to the position of the shaft 15 after the latter has been positioned for cutting the teeth.

The necessity for moving the cutter so that its cutting edge will occupy successive positions on an imaginary helix corresponding with that of the worm destined to engage with the teeth to be cut in the worm-wheel blank will be understood when it is borne in mind that in the usual method of cutting the teeth of worm-wheels by means of a grooved worm-cutter the cutting is effected by several cutting edges, each rotating in a different plane, so that it becomes necessary in cutting the teeth of a worm-wheel by means of a single cutter to move the latter, so that its cutting edge will occupy successive positions corresponding to the various cutting edges of a worm-shaped cutter. The cutting edge of this cutter may be made to occupy these successive positions by making the tool box or holder in the form of a nut adapted to engage a worm on the cutter-shaft corresponding with the worm destined to engage the wheel to be cut and gradually rotating said tool box or holder on this worm relatively to the cutter-shaft as the latter rotates. This arrangement presents, however, certain structural difficulties, and I prefer to use the construction and arrangement of devices shown.

The shaft 15 has a screw-thread whose pitch corresponds with the thread of the worm destined to gear with the wheel to be cut and is accurately fitted within the nut-bearing 26, above referred to, said bearing being provided with thrust collars or flanges 26ª, engaging corresponding grooves in the journal or bearing blocks 18ª to prevent endwise motion. The rotation of the nut is conveyed to the cutter-shaft 15 through the disk 27, which rides over the thread on said shaft, which has sliding motion in said disk, it being provided with a key or feather fitting a longitudinal groove 28 in said shaft. (Shown in Fig. 2.) The nut 26 and disk 27 are, however, not rigidly connected, and it will be seen that relative angular movement between them when one is rotated faster or slower than the other will result in the shaft being screwed into or out of the nut, and as the latter is prevented by its thrust-collars from moving axially relatively to the worm-wheel blank this screw motion causes the cutter 16 to be adjusted to successive positions in the desired helical path, as in making such adjustment the cutter revolves and moves axially with the shaft 15. This movement of the cutter is effected as the cutting proceeds by means of gear-wheels 29 and 30, formed integral with or secured to the nut 26 and disk 27, respectively. These wheels 29 and 30 are of the same diameter; but one of said wheels has one or two teeth more than the other, and both are in gear with an epicyclic wheel 31, carried on a frame 36, secured to disk or gear 27, but so that one side of the frame 36 rotates freely thereon and the other side of said frame on a shoulder of gear 29. This frame 36 is provided with a balance-weight 37 to balance the wheel 31 and frame 36 and connected parts; but it is preferred in some cases to apply another epicyclic wheel 37ª, arranged exactly similar to wheel 31, but on the opposite side of the frame 36, in place of the balance-weight 37, as shown in Fig. 2, and this can be done when one of the gears 29 or 30 has two teeth more than the other, as this arrangement of two epicyclic wheels gives more strength to resist the cutting strain on the cutter 16 which comes upon the teeth of the epicyclic wheels and the wheels 30 and 29 with which they gear.

When the gear 31 is not rotated on its own axis, it remains relatively stationary to the shaft 15, and it and the nut 26 are locked together, as the gears 29 and 30 have not leverage (and this is still more so if there are two epicyclic gears, as above explained) to rotate the gear 31 on its own axis.

When the gear 31 is rotated on its own axis, it travels (like a spur-wheel in a toothed rack) around the gears 29 and 31, taking its frame 36, which carries its axis, with it, or the frame 36 may be moved around the gears 29 and 30, which will cause the gear-wheel 31 to rotate on its own axis over those gears, or the same result will be effected if the frame 36 is arrested or held from rotating when the nut 26 and shaft 15 are being rotated. Consequently when the wheel 31 is rotated by either of the methods above referred to the desired relative angular or rotative movement between the nut 26 and shaft 15 is obtained by the difference in the number of teeth between the gears 29 and 30, and this effects the desired adjustment of the cutter 16 in a helical direction, because the cutter 16 partakes of the motion of the screw-shaft 15, which moves both in the direction of its axis and rotates at the same time. In order to impart a periodical feed motion to said screw-shaft, the frame in which the epicyclic wheel is mounted is or may be held by hand against rotation with the wheels 29 and 30 for a sufficient time at each complete revolution of the wheel-blank or master worm-wheel 1 to impart the required screwing or feeding movement to the screw-shaft 15.

In the operation of cutting with a single cutter the latter, as well as the wheel-blank, revolves many times before the cutting of the teeth is completed. The cutter begins cutting when on a line on one side of the center line A A, Fig. 1, the cut becoming gradually deeper and deeper before the cutter reaches a position on such center line, when the spaces between the teeth will have been cut to their full depth, and as soon as said cutter has been traversed or moved to the opposite side of said center line it will cease to cut. Inasmuch as this screwing or feeding movement needs only to be imparted to the shaft 15 at every revolution of the wheel to be cut and if neglected would not result in any other harm than a mere delay or suspension of the cutting operation it will readily be seen that a single attendant can attend to a number of machines. This periodical movement may, however, be imparted to the shaft by automatically-operating appliances. Thus, for instance, a star-wheel 32, (similar to those commonly used for such purposes,) adapted to engage with a rod 33, may be secured to the spindle of the epicyclic wheel 31. This rod is moved longitudinally into the path of the star-wheel, as it rotates with the frame 36 and shaft 15, at the appropriate time by a rocking lever 34, Fig. 1, fulcrumed at $34^a$ to one of the slideways 19, and is held in contact with the periphery of the face-plate by a spring $34^c$, said face-plate being provided with a projection 35, that at each complete revolution of the face-plate—i. e., the wheel-blank—will move said lever against the stress of its spring and therethrough the rod 33 into the path of the star-wheel 32. As soon as the projection 35 has passed from under the lever 34 the spring $34^c$ will move said lever to its normal position, thereby withdrawing the rod 33 from the path of the star-wheel. The rock-lever has a number of holes $34^b$ for the pivot-pin of the rod 33, so that the latter can be adjusted relatively to the slides and relatively to the face-plate 3 or the diameter of the wheel-blank carried thereby.

The operation of the machine is as follows: The star-wheel 32 is turned by hand, so as to bring the cutter 16 well over to the right or left (as the case may be, according to the direction of cutting) of the center line A A, Fig. 1. The slides 17 and 18 are then adjusted, so that when the cutter reaches said center line A A it will sweep out of the blank the full depth of the tooth, and the star-wheel is then turned by hand until the cutter (which is on one side of said line A A) as it revolves just begins to cut the blank. The remaining operation is or may be quite automatic, the effect of the automatic turning or "feeding" of the star-wheel being to traverse the cutter from one to the other side of the center line A A until it ceases to act upon the worm-wheel blank, when the operation will be completed. In a machine organized as described a different cutter-shaft or master-screw 15 and nut-bearing 26 are required for each different pitch of worm-wheel to be cut. This change involves a disturbance in the gearing, which is a more or less tedious work, to avoid which I use a sleeve-bearing devoid of a screw-thread and provided with a removable nut fitting into the outer end of said bearing, as shown in Fig. 5, so that the screw-shaft and its nut can be slipped out of their bearings and another screw-shaft and nut substituted therefor, as shown in Fig. 5, wherein $26^b$ indicates the right-hand sleeve-bearing, having a plane bore for the passage of the cutter-shaft 15, said bearing having in its outer or right-hand end a seat for a nut $26^c$, connected with the bearing by a tongue-and-groove joint or key and groove, so as to revolve with the bearing and to be readily slid out of the same, a retaining plate or disk $27^d$, bolted to the outer face of the bearing-sleeve, holding the nut against endwise motion. By the means described the shaft, after removal of the cutter and disk $27^d$, can be withdrawn from the bearing-sleeve without disturbing the gearing.

I have hereinabove stated that a master screw-shaft 15, the pitch of whose screw-threads corresponds with that of the wheel to be cut, is required, so that when worm-wheels the pitch of whose teeth differs are to be cut a different screw-shaft 15, having a thread of corresponding pitch, is required; but the same screw-shaft 15 can be used for wheels of different diameters having teeth of the same pitch, and to cut worm-wheels adapted to gear with worms of larger or smaller diameter it will only be necessary to adjust the cutter 16 to or from the axis of the shaft 15 accordingly.

Inasmuch as the cutting-tool used is one of the same shape as the tooth of the worm intended to gear with the wheel to be cut, the cost of making such tool is trifling when compared with the cost of making a worm-shaped cutter such as have hitherto been used, as hereinabove referred to. In cutting double-threaded screws two cutters are secured to the shaft 15 at the proper pitch apart on opposite sides of said shaft.

Having thus described my invention, what I claim as new therein, and desire to secure by Letters Patent, is—

1. A gear-cutting machine comprising a standard wheel, a holder for the wheel-blank revolved by said standard wheel, a cutter-shaft, a driving-shaft geared to the standard wheel and cutter-shaft, a cutting-tool on said cutter-shaft, and mechanism adapted to automatically impart to the latter shaft successive rectilinear movements independently of its normal rotation to successively move the cutting edge of the tool into positions on an imaginary helical curve of pitch corresponding with that of the gear destined to mesh with the wheel to be cut, for the purpose set forth.

2. A gear-cutting machine comprising a standard wheel, a holder for the wheel-blank revolved by said standard wheel, a cutter-shaft, a driving-shaft geared to the standard wheel and cutter-shaft, a cutting-tool on said cutter-shaft, and mechanism adapted to impart to the latter shaft successive partial rotary and rectilinear movements, independently of its normal rotation to successively move the cutting edge of the tool into positions on an imaginary helical curve of pitch corresponding with that of the gear destined to mesh with the wheel to be cut, for the purpose set forth.

3. A gear-cutting machine comprising a standard wheel, a holder for the wheel-blank revolved by said standard wheel, a cutter-shaft carrying a cutter, a driving-shaft geared to the standard wheel and cutter-shaft, the latter provided with a screw-thread of the same pitch as that of the teeth to be cut, a nut fitting said thread, said nut revoluble with the shaft but held against endwise movement, and mechanism adapted to impart to the shaft successive partial rotary movements in the nut to move the shaft endwise and cause the edge of the cutter thereon to occupy successive positions on an imaginary helical curve corresponding with that of the gear destined to mesh with the wheel to be cut, for the purpose set forth.

4. A gear-cutting machine comprising a standard wheel, a holder for the wheel-blank revolved from said standard wheel, a screw-threaded cutter-shaft, a nut fitting the thread on said shaft, a driving-shaft geared to the standard wheel and to the nut on the cutter-shaft, transmitting-gearing between the cutter-shaft and its nut to cause the same to revolve together and mechanism adapted to periodically impart a partial rotation to the shaft in its nut, for the purpose set forth.

5. A gear-cutting machine comprising a standard wheel, a holder for the wheel-blank revolved by said standard wheel, a cutter-shaft provided with a screw-thread of the same pitch as that of the teeth of the wheel to be cut, a cutter on said shaft, a nut fitting the thread thereon, a driving-shaft geared to the standard wheel and the said nut to revolve the cutter-shaft in synchronism with the wheel-blank, transmitting-gearing between the nut and its shaft to cause the same to revolve together, and an epicyclic wheel or wheels in gear with the transmitting gear-wheels, for the purpose set forth.

6. A gear-cutting machine comprising a standard wheel, a holder for the wheel-blank revolved by said standard wheel, a cutter-shaft provided with a screw-thread of the same pitch as that of the teeth of the wheel to be cut, a cutter on said shaft, a nut fitting the thread thereon, a driving-shaft geared to said nut and standard wheel to revolve the cutter-shaft in synchronism with the wheel-blank, transmitting gear-wheels between the nut and its shaft to cause the same to revolve together, an epicyclic wheel in gear with the transmitting gear-wheels, and a balanced support for the epicyclic wheel secured to one of the transmitting-wheels, for the purpose set forth.

7. A gear-cutting wheel comprising a standard wheel, a holder for the wheel-blank revolved by said standard wheel, a cutter-shaft provided with a screw-thread of the same pitch as that of the teeth of the wheel to be cut, a cutter on said shaft, a nut fitting the thread thereon, a driving-shaft geared to said nut and to the standard wheel to revolve the cutter-shaft in synchronism with the wheel-blank, transmitting gear-wheels between the nut and its shaft to cause the same to revolve together, an epicyclic wheel in gear with the transmitting gear-wheels, a balanced support for the epicyclic wheel carried by the transmitting-wheels, and mechanism controlled by the rotation of the standard wheel to impart to the epicyclic wheel a partial rotation at each revolution of such standard wheel, for the purpose set forth.

8. The combination with a standard wheel, a face-plate on the shaft of such wheel adapted to receive and carry the wheel-blank, said face-plate provided with a peripheral projection; of a cutter-shaft provided with a screw-thread of the same pitch as that of the teeth of the wheel to be cut, a cutting-tool on said shaft, means for adjusting the latter in the plane of its axis and toward and from said face-plate, a nut fitting the thread on the cutter-shaft, a driving-shaft geared to said nut and to the standard wheel to cause them to revolve synchronously, transmitting gear-wheels between said nut and the cutter-shaft to cause them to revolve together without interfering with endwise motion of the shaft, an epicyclic wheel in gear with said transmitting-gearing, a balanced support for said epicyclic wheel carried by the transmitting gear-wheels, a star-wheel on the spindles of said epicyclic wheel, a two-armed rock-lever, one of whose arms is held in contact with the periphery of the aforesaid face-plate, a rod adjustable lengthwise on the other arm of said rock-lever and adapted to be moved thereby into and out of the path of the aforesaid star-wheel, substantially as and for the purpose set forth.

9. In a machine such as described, the combination with the screw-threaded cutter-shaft, of a revoluble bearing-sleeve, a nut fitting the thread on said shaft removably seated in one end of said sleeve and revoluble therewith, and transmitting-gearing connecting said sleeve with the shaft to cause them to revolve together without interfering with endwise motion of said shaft, whereby the shaft and its nut can be removed from their bearings without interfering with the driving-gearing, substantially as set forth.

10. The combination with the standard wheel, a face-plate on the shaft of such wheel adapted to receive and carry the wheel-blank, said face-plate provided with a peripheral projection; of a cutter-shaft provided with a screw-thread of the same pitch as that of the teeth of the wheel to be cut, a cutting-tool on said shaft, a nut fitting the thread thereon, a driving-shaft geared to said nut and to the standard wheel to revolve them synchronously, transmitting gear-wheels connecting the nut with the cutter-shaft to cause the same to revolve together without interfering with the endwise motion of such shaft, an epicyclic wheel in gear with the transmitting gear-wheels, a balanced support for said epicyclic wheel carried by the transmitting gear-wheels, a star-wheel on the spindle of the epicyclic wheel, a two-armed rock-lever, one of whose arms is held in contact with the periphery of the face-plate, a rod pivoted to the other arm of said lever and adapted to be moved into and out of the path of the aforesaid star-wheel, for the purpose set forth.

In testimony that I claim the foregoing as my invention I have signed my name in presence of two subscribing witnesses.

JOSEPH HAMILTON GIBSON.

Witnesses:
PETER J. LIVSEY,
WILLIAM FAULKNER.